United States Patent
Choi et al.

(10) Patent No.: US 11,615,510 B2
(45) Date of Patent: Mar. 28, 2023

(54) KERNEL-AWARE SUPER RESOLUTION

(71) Applicant: Samsung Electronics Co., Ltd., Suwon-si (KR)

(72) Inventors: Baekdu Choi, West Lafayette, IN (US); Ruiwen Zhen, Allen, TX (US); John W. Glotzbach, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 17/139,885

(22) Filed: Dec. 31, 2020

(65) Prior Publication Data

US 2022/0122223 A1 Apr. 21, 2022

Related U.S. Application Data

(60) Provisional application No. 63/094,386, filed on Oct. 21, 2020.

(51) Int. Cl.
| | |
|---|---|
| *G06T 3/40* | (2006.01) |
| *G06T 5/00* | (2006.01) |
| *G06T 5/50* | (2006.01) |

(52) U.S. Cl.
CPC .......... *G06T 3/4076* (2013.01); *G06T 5/002* (2013.01); *G06T 5/003* (2013.01); *G06T 5/50* (2013.01);
(Continued)

(58) Field of Classification Search
CPC ....... G06T 3/4076; G06T 5/002; G06T 5/003; G06T 5/50; G06T 2207/20016;
(Continued)

(56) References Cited

U.S. PATENT DOCUMENTS

| | | | |
|---|---|---|---|
| 3,184,182 A1 | 5/2012 | Lee et al. | |
| 8,279,341 B1 * | 10/2012 | Bozinovic | ............ G06T 3/4053 348/452 |

(Continued)

FOREIGN PATENT DOCUMENTS

| | | | | |
|---|---|---|---|---|
| CN | 104966269 A | * | 10/2015 | ........... G06T 3/4053 |
| CN | 106251297 A | * | 12/2016 | ............ G06T 5/003 |

(Continued)

OTHER PUBLICATIONS

PyTorch 1.7.0 documentation "PixelShuffle," https://pytorch.org/docs/stable/generated/torch.nn.PixelShuffle.html?highlight=pixelshuffle#torch.nn.PixelShuffle, 2019, 2 pages.

(Continued)

*Primary Examiner* — Jose L Couso

(57) ABSTRACT

An electronic device includes at least one imaging sensor and at least one processor coupled to the at least one imaging sensor. The at least one imaging sensor is configured to capture a burst of image frames. The at least one processor is configured to generate a low-resolution image from the burst of image frames. The at least one processor is also configured to estimate a blur kernel based on the burst of image frames. The at least one processor is further configured to perform deconvolution on the low-resolution image using the blur kernel to generate a deconvolved image. In addition, the at least one processor is configured to generate a high-resolution image using super resolution (SR) on the deconvolved image.

20 Claims, 10 Drawing Sheets

(52) U.S. Cl.
CPC .............. *G06T 2207/20016* (2013.01); *G06T 2207/20212* (2013.01)

(58) Field of Classification Search
CPC ......... G06T 2207/20212; G06T 3/4053; G06T 2207/20028; G06T 2207/20182; G06T 5/001; G06T 5/20; G06T 5/00; G06T 7/10; G06T 7/12; G06T 7/13; G06T 7/44; G06T 9/2013; G06T 2207/20192; G06T 2207/20208; G06T 2207/20221; G06T 3/4046; G06T 9/002; G06T 2207/20081; G06T 2207/20084; G06V 10/30; G06V 10/454; G06V 10/82; G06V 30/18057; G06K 9/0051; G06K 7/1482; H04N 2201/00; H04N 5/23229; H04N 1/409; H04N 1/4095; H04N 1/58; G06N 3/02; G06N 3/08–088; G06N 3/0454; G06N 7/00; G06N 20/00
See application file for complete search history.

(56) References Cited

U.S. PATENT DOCUMENTS

| | | | |
|---|---|---|---|
| 8,750,643 | B2 | 6/2014 | Sun et al. |
| 9,007,490 | B1 | 4/2015 | Yuan et al. |
| 9,042,672 | B2 | 5/2015 | Wang et al. |
| 9,443,288 | B1* | 9/2016 | Yang .................. G06T 5/10 |
| 9,445,003 | B1* | 9/2016 | Lelescu ............ H04N 5/23232 |
| 10,755,390 | B2 | 8/2020 | Wang et al. |
| 2007/0120095 | A1* | 5/2007 | Gruner ................ H01L 29/0673 |
| | | | 252/500 |
| 2007/0217713 | A1* | 9/2007 | Milanfar ............... G06T 3/4053 |
| | | | 382/299 |
| 2010/0021084 | A1* | 1/2010 | Douglas ................ G06T 3/4053 |
| | | | 382/299 |
| 2011/0115934 | A1* | 5/2011 | Wang ................... G06T 3/4076 |
| | | | 348/222.1 |
| 2012/0201477 | A1* | 8/2012 | Jesneck ................ G06T 3/4069 |
| | | | 382/279 |
| 2012/0321200 | A1 | 12/2012 | Park et al. |
| 2013/0121568 | A1* | 5/2013 | Krishnan ............. G06T 3/4053 |
| | | | 382/300 |
| 2014/0132784 | A1 | 5/2014 | Chouly et al. |
| 2014/0354886 | A1* | 12/2014 | Michaeli .............. H04N 1/4092 |
| | | | 348/607 |
| 2019/0318459 | A1* | 10/2019 | Chen ........................ G06T 5/20 |

FOREIGN PATENT DOCUMENTS

| | | | | |
|---|---|---|---|---|
| CN | 107403414 A | * | 11/2017 | ........... G06K 9/2054 |
| CN | 108305230 A | * | 7/2018 | ........... G06T 3/4053 |
| WO | 2020/033432 A1 | | 2/2020 | |

OTHER PUBLICATIONS

Ledig et al., "Photo-Realistic Single Image Super-Resolution Using a Generative Adversarial Network," Proceedings of the IEEE Conference on Computer Vision and Pattern Recognition (CVPR), Honolulu, HI, Jul. 21-26, 2017, 2 pages.

Zhang et al., "Deep Plug-and-Play Super-Resolution for Arbitrary Blur Kernels," Proceedings of the IEEE Conference on Computer Vision and Pattern Recognition (CVPR), Long Beach, California, Jun. 15-20, 2019, 11 pages.

International Search Report and Written Opinion of the International Searching Authority for International Patent Application No. PCT/KR2021/014850 dated Jan. 25, 2022, 8 pages.

* cited by examiner

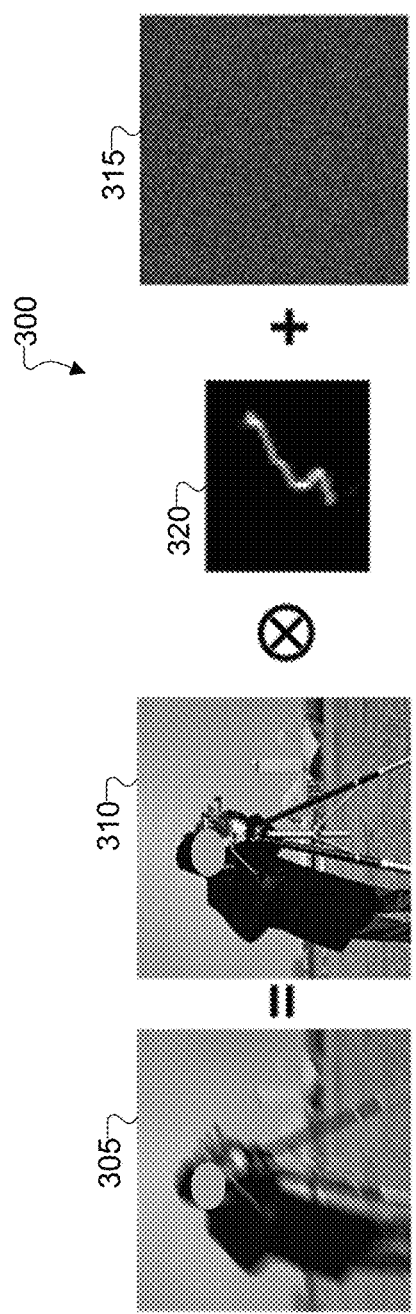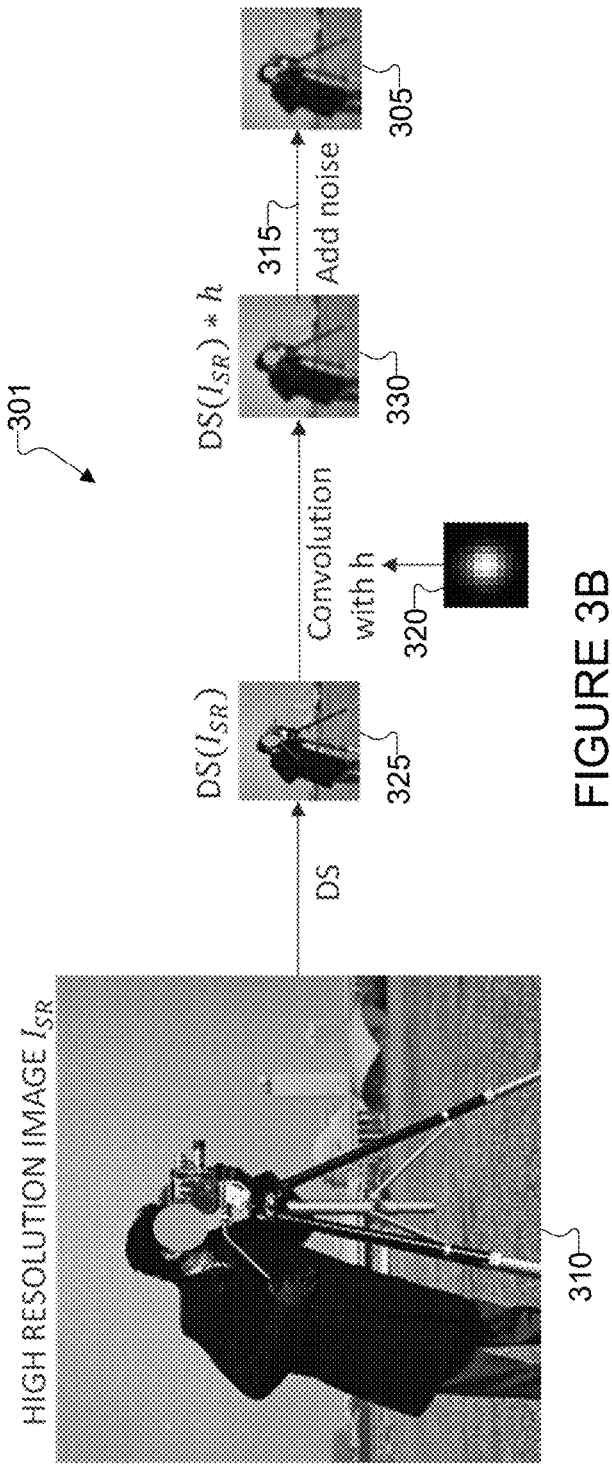
FIGURE 3A
FIGURE 3B

KERNEL-AWARE SUPER RESOLUTION

CROSS-REFERENCE TO RELATED APPLICATION AND PRIORITY CLAIM

This application claims priority under 35 U.S.C. § 119(e) to U.S. Provisional Patent Application No. 63/094,386 filed on Oct. 21, 2020, which is hereby incorporated by reference in its entirety.

TECHNICAL FIELD

This disclosure relates generally to image processing systems. More specifically, this disclosure relates to systems and methods for kernel-aware super resolution.

BACKGROUND

Image super resolution is a technique for generating visually-pleasant, high-resolution images given lower-resolution images. Existing super resolution techniques are often built on the assumption that an original image is simply a downscaled version of a larger, good-quality image. However, this is not necessarily true in some cases, and applying an existing super resolution technique may not result in a good-quality upscaled image.

SUMMARY

This disclosure provides systems and methods for kernel-aware super resolution.

In a first embodiment, an electronic device is configured to provide for kernel-aware super resolution. The electronic device includes at least one imaging sensor and at least one processor coupled to the at least one imaging sensor. The at least one imaging sensor is configured to capture a burst of image frames. The at least one processor is configured to generate a low-resolution image from the burst of image frames. The at least one processor is also configured to estimate a blur kernel based on the burst of image frames. The at least one processor is further configured to perform deconvolution on the low-resolution image using the blur kernel to generate a deconvolved image. In addition, the at least one processor is configured to generate a high-resolution image using super resolution on the deconvolved image.

In a second embodiment, a method provides for kernel-aware super resolution. The method includes capturing, using at least one imaging sensor of an electronic device, a burst of image frames. The method also includes generating, using at least one processor of the electronic device, a low-resolution image from the burst of image frames. The method further includes estimating, using the at least one processor, a blur kernel based on the burst of image frames. The method also includes performing, using the at least one processor, deconvolution on the low-resolution image using the blur kernel to generate a deconvolved image. In addition, the method includes generating, using the at least one processor, a high-resolution image using super resolution on the deconvolved image.

In a third embodiment, a non-transitory machine readable medium stores instructions that are configured to provide for kernel-aware super resolution. The instructions, when executed by at least one processor of an electronic device, cause the at least one processor to obtain a burst of image frames. The instructions, when executed, also cause the at least one processor to generate a low-resolution image from the burst of image frames. The instructions, when executed, further cause the at least one processor to estimate a blur kernel based on the burst of image frames. The instructions, when executed, also cause the at least one processor to perform deconvolution on the low-resolution image using the blur kernel to generate a deconvolved image. In addition, the instructions, when executed, cause the at least one processor to generate a high-resolution image using super resolution on the deconvolved image.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which:

FIGS. 3A and 3B illustrate example image frames at each step of a kernel-aware single-image super resolution algorithm according to embodiments of this disclosure;

DETAILED DESCRIPTION

Figure 1:
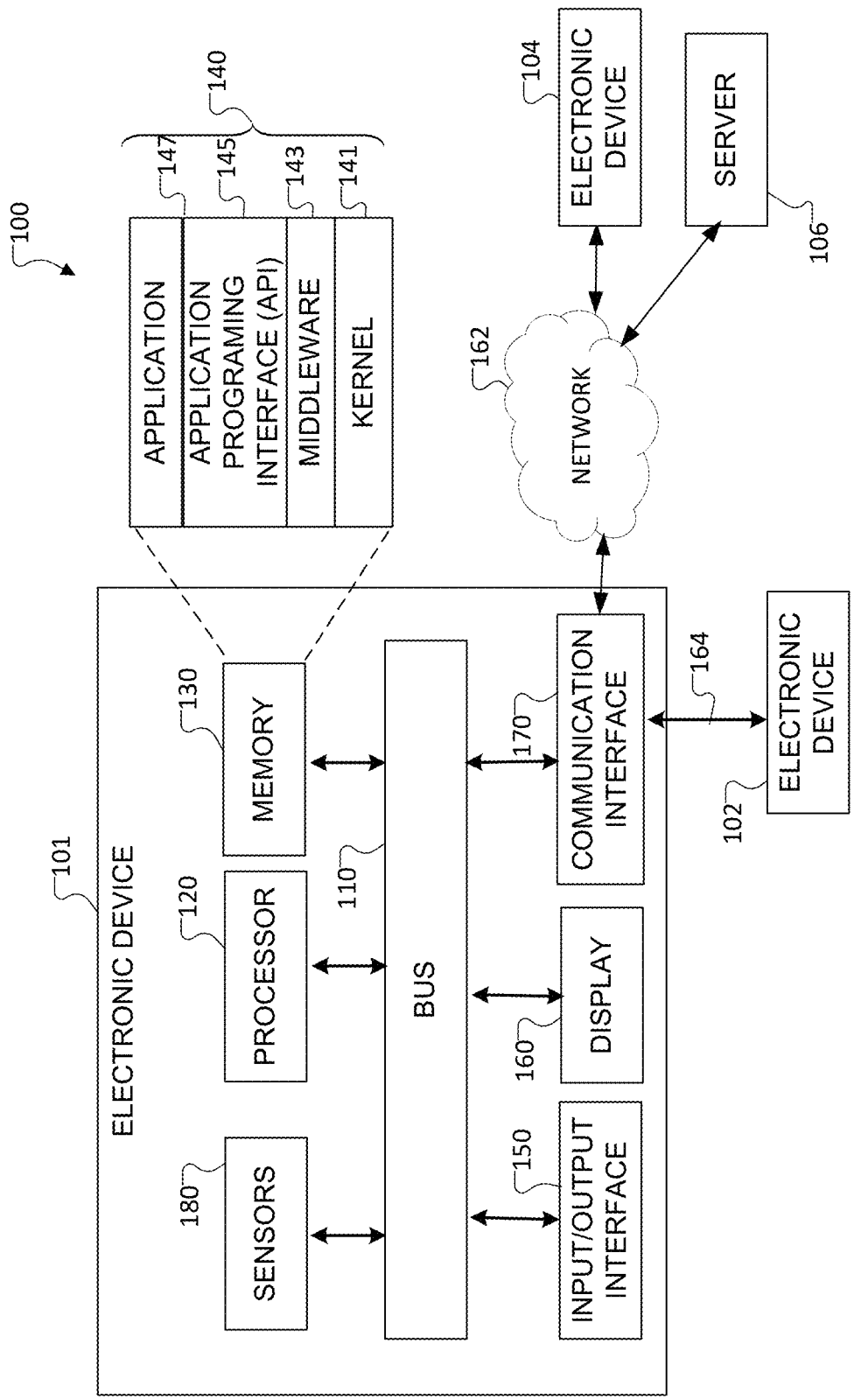
FIG. 1 illustrates an example network configuration according to embodiments of this disclosure.

FIGS. 1 through 10, discussed below, and the various embodiments of this disclosure are described with reference to the accompanying drawings. However, it should be appreciated that this disclosure is not limited to the embodiments and all changes and/or equivalents or replacements thereto also belong to the scope of this disclosure. The same or similar reference denotations may be used to refer to the same or similar elements throughout the specification and the drawings.

Blending multiple images captured using a handheld device is known to generate good-quality upscaled images. To upscale images even further, single-image super resolution (SISR) can be applied to a single image. For deep neural network (DNN)-based SISR to generate high-quality upscaled images, machine learning networks can be trained with datasets generated by applying bicubic downscaling to high-resolution images. However, bicubic downscaling can prevent the machine learning networks from being successfully trained in some cases, such as a blurry input image which is modelled differently from a bicubic downscaling model, and multiple-image super resolution (MISR) procedures inherently making resulting super resolution images blurry. A kernel-aware SISR framework addresses these issues by applying deconvolution prior to DNN-based SISR and de-noising. To generate upscaled images without noise artifacts while keeping image details, two intermediate upscaled images are often generated using different denoising strengths and then combined to generate final upscaled images. Qualitative experiments show that a kernel-aware SISR framework outperforms benchmark SISR algorithms when applied to MISR images.

Multi-frame blending image super resolution takes a set of image frames from a single shutter press with a handheld device and combines the image frames to increase spatial resolution of the capture device. After the image frames are acquired, the image frames are aligned, such as with respect to a base frame, for a blending procedure. Due to the randomness of natural hand tremors, alignment of the image frames is unknown but can be estimated. While alignment algorithms for multi-frame processing with subpixel accuracy have been proposed, multi-frame blended super resolution images often come out blurry due to, for instance, small unavoidable misalignments. The blurriness provides a challenge for applying modern SISR algorithms to multi-frame blending super resolution, since blurry images cannot be modeled with a simple bicubic degradation model normally used for modern SISR algorithms.

This disclosure provides an SISR algorithm that can be applied to MISR images. As described in more detail below, the SISR algorithm applies deconvolution (such as least-squares deconvolution) prior to super resolution in order to address the blurriness of input images. To suppress image artifacts without losing image details, the SISR algorithm may generate two intermediate super resolution images (one with strong denoising and the other with weak denoising) and combine the intermediate images to generate a final output image.

This disclosure also describes a novel image super resolution algorithm that takes advantage of blur kernel information to overcome blurriness of an original image and adds denoising to get a clean and smooth image. As described in more detail below, the clean and smooth image is generated by dividing the problem of retrieving a high-resolution image from a blurry lower-resolution image into multiple subproblems (such as image deconvolution and super resolution). Halo artifacts, detail losses, or other issues can be addressed, such as by combining two high-resolution images generated using different regularization parameters.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, for example, the processor 120 may generate a low-resolution image from a burst of image frames, estimate a blur kernel based on the burst of image frames, perform deconvolution on the low-resolution image using the blur kernel to generate a deconvolved image, and generate a high-resolution image using super resolution on the deconvolved image.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, perform image processing as described below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors, which may be used to capture image frames of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 may execute one or more applications that, among other things, generate a low-resolution image from a burst of image frames, estimate a blur kernel based on the burst of image frames, perform deconvolution on the low-resolution image using the blur kernel to generate a deconvolved image, and generate a high-resolution image using super resolution on the deconvolved image.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
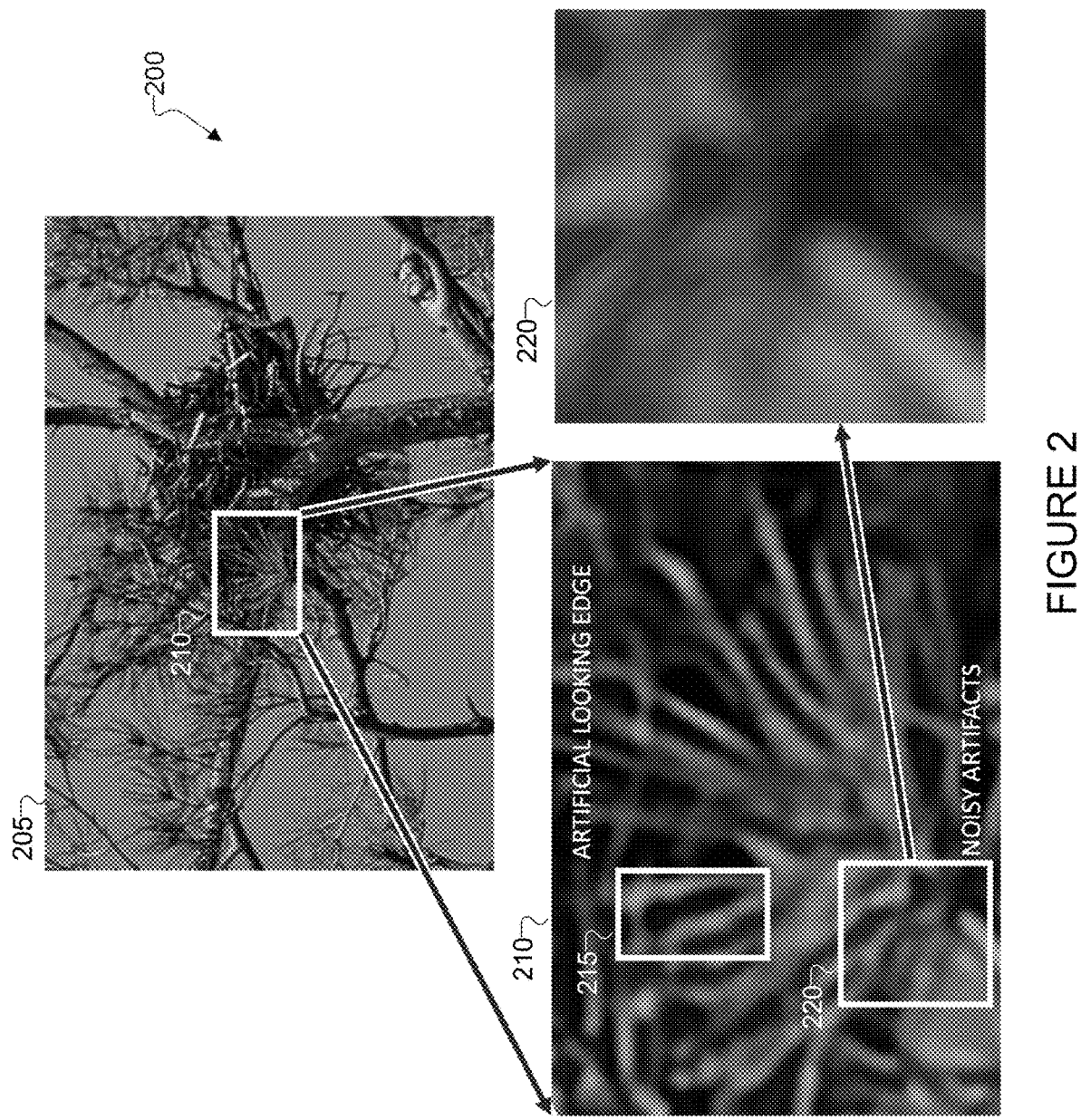
FIG. 2 illustrates issues of one of the existing super resolution algorithms.

FIG. 2 illustrates an example super resolution algorithm 200. Ideally, the image super resolution algorithm 200 is used to generate visually-pleasant high-resolution images given low-resolution images. Using simple interpolation techniques for image super resolution tends to result in soft and blurry edges and loss of high-frequency detail. Through image super resolution algorithms, such as a super resolution feedback network (SRFBN) algorithm, may estimate a high-resolution version of an input image using convolutional neural networks. If an original image does not match characteristics of modeled low-resolution images, the result is not promising.

As a particular example of this, an image 205 of an outdoor scene is captured at a low zoom as shown in FIG. 2. The outdoor scene here has a bird's nest at a center of a frame, along with branches extending in different directions. The sky in the background is clear without clouds. A zoomed image 210 is a cropped version of the image 205 but expanded to fit an entire frame. Enlarging the image 205 to a size of the zoomed image 210 provides a low-resolution image based on having less pixel details for an equal frame size. The zoomed image 210 presents problems in the frame, such as artificial-looking edges 215 and noisy artifacts 220. The artificial-looking edges 215 appear to be wavy, where the same edge in the original image appears to be straight. The noisy artifacts 220 can appear to show holes in locations that should be solid and continuous.

FIGS. 3A and 3B illustrate example image frames at each step of a kernel-aware single-image super resolution algorithm according to embodiments of this disclosure. FIGS. 3A and 3B illustrate examples of the proposed model according to embodiments of this disclosure. In particular, FIG. 3A illustrates representations of a convolution model 300, and FIG. 3B illustrates a combined bicubic convolution model 301.

As shown in FIG. 3A, a low-resolution image 305 represents an image patch that is cropped from an image merged from a burst of Bayer frames. The Bayer frames are aligned against a base frame, such as by using estimated motion vectors at the sub-pixel level. Because the alignment cannot be perfect, inherent small misalignments can make resulting images blurry. Therefore, current super resolution techniques are inapplicable, since most assume an input image is simply a downscaled version of a larger good-quality image through a bicubic model. The bicubic model can be expressed as follows:

$$I_0 = DS(I_{SR}) + \mathcal{N} \quad (1)$$

where $I_0$ represents an input image or low-resolution image 305, DSO represents a bicubic downscale operator, $I_{SR}$ represents a super resolution image 310 or a high-resolution image, and N represents additive noise 315. To address any blurry effects, the image is assumed to be convolved with h, which represents a blur kernel 320. The convolution model 300 can therefore be expressed as follows:

$$I_0 = I * h + \mathcal{N} \quad (2)$$

In the combined bicubic convolution model 301 illustrated in FIG. 3B, a low-resolution image 305 is processed by combining the bicubic model of Equation (1) with the convolution model 300 of Equation (2), which can be expressed as follows:

$$I_0 = DS(I_{SR}) * h + \mathcal{N} \quad (3)$$

To approximate the blur kernel h 320, kernels can be estimated on multiple cropped image patches with similar blurriness, numerically averaged, and modelled by an anisotropic Gaussian function. The combined bicubic convolution model 301 performs a down-sampling operation of the high-resolution image 310 to generate a down-sampled image 325 or deconvolved image. Convolution with the blur kernel 320 is performed on the down-sampled image 325 to generate a convolved image 330. The convolved image 330 has noise added to generate the low-resolution image 305. In practice, the combined bicubic convolution model is run in reverse from the low-resolution image 305, which is described in greater detail below.

Figure 4:
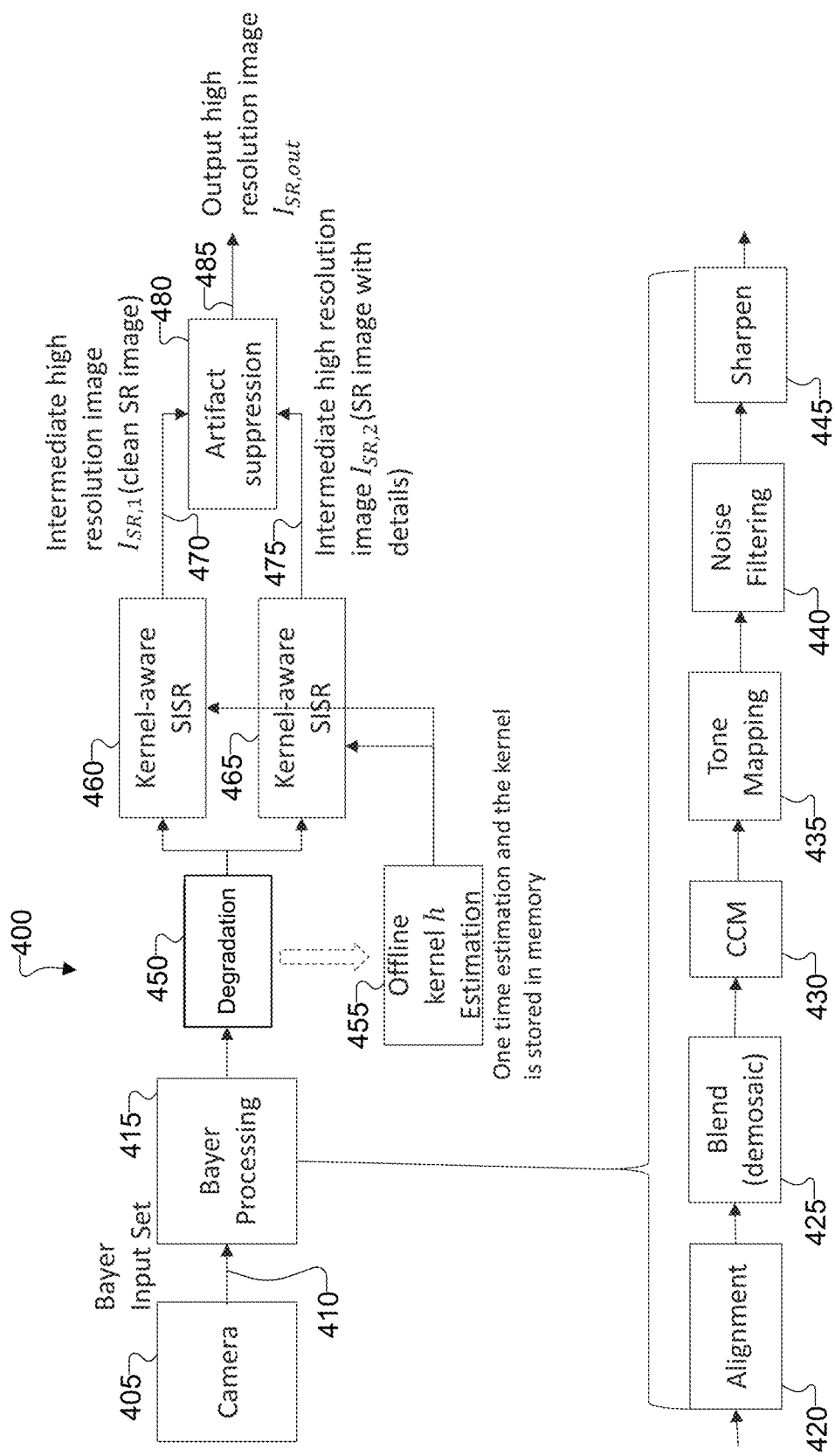
FIG. 4 illustrates an example kernel-aware single-image super resolution algorithm according to embodiments of this disclosure.

FIG. 4 illustrates an example kernel-aware single-image super resolution algorithm 400 according to embodiments of this disclosure. For ease of explanation, the algorithm 400 of FIG. 4 may be described as being performed using the electronic device 101 of FIG. 1. However, the algorithm 400 may be performed using any other suitable device and in any other suitable system, such as when the algorithm 200 is performed using the server 106.

As shown in FIG. 4, a camera 405 or other imaging sensor (which may represent one or more imaging sensors 180 in FIG. 1) is used to capture a burst of image frames. A color filter array may be added on top of or otherwise used in or with the camera 405 such that an output of the camera 405 is a Bayer image 410 (referred to as Bayer data), where each pixel records only one of three colors. As each pixel in the Bayer image 410 cannot fully specify each of the red, green, and blue values on its own, demosaicing operations can be performed to interpolate a set of complete red, green, and blue values for each pixel. The camera 405 can capture one or multiple Bayer images 410 of a scene.

A Bayer processing algorithm 415 interpolates the red, green, and blue image signals that are output from the camera 405 in the form of the Bayer images 410. In a Bayer color filter array (CFA) pattern, half of the pixels are green pixels as luminance-sensitive elements, and the remaining pixels are aligned constantly as red and blue pixels as chrominance-sensitive elements. Each pixel in the Bayer CFA pattern is sensitive to only one color (red, green, or blue). Therefore, color images obtained through a Bayer CFA pattern are interpolated in three color channels in order to form full-color images.

An image alignment algorithm 420 can include registration and scene analysis for the multiple Bayer images 410. In some embodiments, the image alignment algorithm 420 can use feature detectors and tracking for image registration and alignment. That is, the image alignment algorithm 420 can jointly use feature detection and tracking and local motion estimation. The image registration analyzes the multiple Bayer images 410 for warp and generates a set of matrices for each image within the Bayer images 410. For each image, the set of affine matrices indicates an amount by which each image is warped compared to a reference image. For instance, the set of affine matrices may indicate the displaced points within a non-reference image and the corresponding amounts by which the displaced points were linearly and/or angularly translated compared to a reference image. The scene analysis can determine an amount of motion occurring within a scene captured in the multiple Bayer images 410. For example, the scene analysis may receive the affine matrices from the registration operation and use the affine matrices to avoid interpreting warp as object motion within the scene. The scene analysis can select which images within the multiple Bayer images 410 to be blended together to form a composite image.

A blending algorithm 425 can provide a resultant image that contains full red, green, and blue channels. For example, the full green channel can be obtained using interpolation or demosaicing on the green color content received from the camera 405. In the resultant image generated after demosaicing, most of the noise may correlate to demosaicing from the white channel because of the availability of an MB image for de-noising. A color correction matrix (CCM) algorithm 430 can remove interferences of red, green, and blue channels of an image single output from a white balance controller. A color correction matrix may be used to process sensor characteristics to spectral characteristics of the human eye, and the Bayer images 410 can have a color correction matrix applied to adjust the RGB pixels. A tone mapping algorithm 435 applies a global tone mapping curve on the blending output to brighten-up darker areas and increase image contrast. A noise filtering algorithm 440 can perform noise filtering on an image output from the tone mapping algorithm 435, such as to remove moving objects and background activity. A sharpen algorithm 445 performs edge enhancement on the image output from the noise filtering algorithm 440, such as by finding edges in the scene and removing waviness so that the edges are clear and not fuzzy.

The output of the Bayer processing algorithm 415 is a single RGB image that is output to a degradation algorithm 450, which enlarges and then crops the RGB image. SISR algorithms often require a training step using low-resolution and high-resolution image pairs. The training data may be generated from a dataset containing high-quality high-resolution images, such as the DIV2K dataset. Low-resolution counterparts for the images in the dataset can be generated, such as by following the degradation model as in Equation (1), where JO represents low-resolution images 305 and $I_{SR}$ represents high-resolution images 310. This model assumes that the low-resolution images 305 are of good quality (other than noise), which is not suitable for multi-frame blended super resolution images since those tend to be blurry. Therefore, applying an SISR algorithm directly to the multi-frame blended super resolution images will not generate high-quality super resolution images 310. A degradation model with a blur kernel can be used instead of Equation (1) as expressed above as Equation (3), where the low-resolution images 305 are modeled as bicubic down-scaled from high-resolution images 310 and deconvolved with a blur kernel 320. However, this process can be modified by applying deconvolution prior to super resolution, which is described in more detail below. Thus, the low-resolution image 305 is used in a kernel estimation algorithm 455 and first and second kernel-aware SISR algorithms 460 and 465.

The kernel estimation algorithm 455 can estimate a blur kernel from a single image. Blur kernel estimation can also be performed offline for multiple multi-frame blended super resolution images and averaged together. The averaged blur kernel is used for the deconvolution step. While using the average blur kernel may hinder the SISR algorithms 460 and 465 from using an exact kernel for each input image, the blur kernel does not need to be precise to get good-quality super resolution output images. Note, however, that nothing prevents the exact kernel from being identified and used for each input image. In some cases, the blur kernel can be estimated using predictive derivatives $P_j$ and derivatives of an input blurry image $I_j$ by an optimization, which can be expressed as follows:

$$h^* = \arg\min_h \sum_j w_j \|h * P_j - I_j\|_2^2 + \beta \|h\|_2^2 \qquad (4)$$

Here, represents different partial derivatives and $w_j$ is a weight for each partial derivative, where the partial derivatives $(P_j, I_j) \in \{(P_x, \delta_x I), (P_y, \delta_y I), (\delta_x P_x, \delta_{xx} I), (\delta_y, _y P_y \delta_{yy} I), (\frac{1}{2}(\delta_x P_y + \delta_y P_x), \delta_{xy} I)\}$ are used. For prediction of the derivatives, the algorithm may apply bilateral filtering BL(P; r, $\sigma_s$, $\sigma_r$) before shock filtering SH(P; itr, dt, h) is applied, and the predicted derivatives can be limited with an input-dependent threshold. This kernel estimation can be performed in different scales, such as from coarse to fine, in order to gradually increase the accuracy of the estimation. For each scale, the procedure described above can be performed multiple times, such as seven times. The blur kernels from the previous step are a rough approximation of real kernels. To reduce noise and irregularity, blur kernels of an image set can be averaged and further modeled by a parameterized anisotropic Gaussian function, and the best parameters can be searched for in order to minimize a defined loss function. Example operations of the kernel estimation algorithm 455 are described in greater detail below with respect to FIGS. 5A and 5B.

Each of the first and second kernel-aware SISR algorithms 460 and 465 produces an intermediate super resolution image from the low-resolution image output from the degradation algorithm 450. The first kernel-aware SISR algorithm 460 produces a clean super resolution image 470, and the second kernel-aware SISR algorithm 465 produces a detail super resolution image 475. Example operations of the first and second kernel-aware SISR algorithms 460 and 465 are described in greater detail below with respect to FIGS. 7A, 7B, 8A, and 8B.

An artifact suppression algorithm 480 generates an output super resolution image 485 using the clean super resolution image 470 and the detail super resolution image 475. Based on the SISR algorithm, halo artifacts can be included in the high-resolution image, and the artifact suppression algorithm 480 reduces or removes halo artifacts based on the processing of the clean super resolution image 470 and the detail super resolution image 475. Example operations of the artifact suppression algorithm 480 are described in greater detail below with respect to FIG. 9.

Figure 5A:
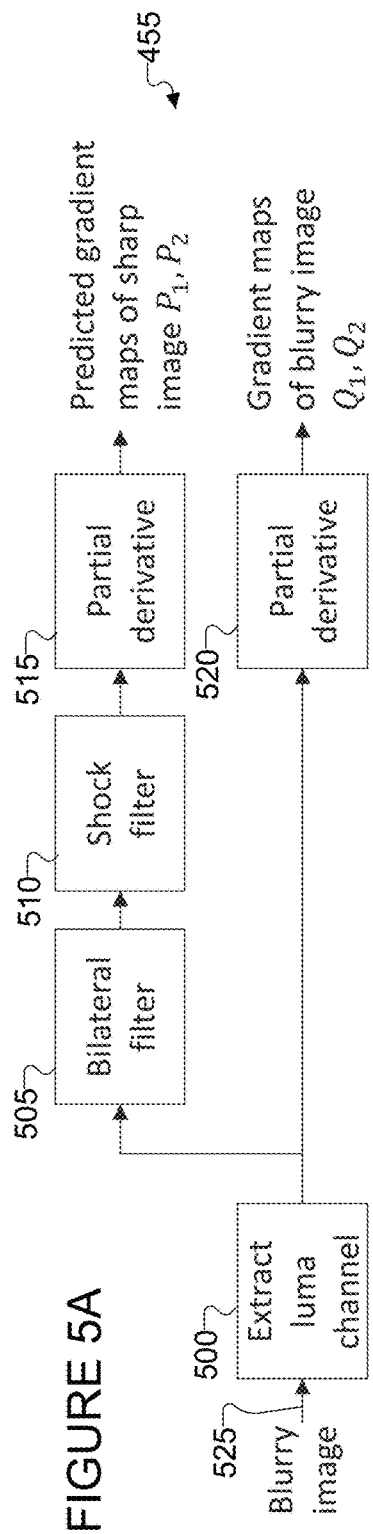
FIGS. 5A and 5B illustrate an example kernel estimation algorithm according to embodiments of this disclosure.
Figure 5B:
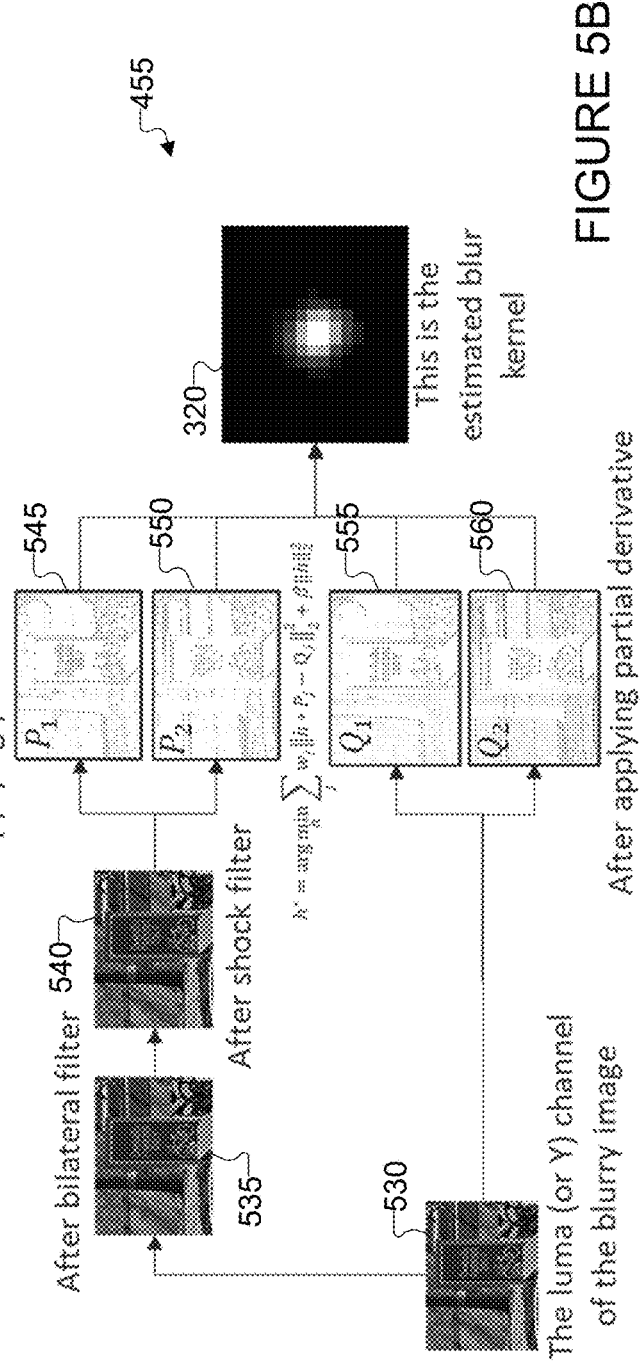

FIGS. 5A and 5B illustrate an example kernel estimation algorithm 455 according to embodiments of this disclosure. In particular, FIG. 5A illustrates an example flow chart for the kernel estimation algorithm 455, and FIG. 5B illustrates example results of each stage of the kernel estimation algorithm 455. For ease of explanation, the algorithm 455 and the results may be described with reference to the electronic device 101 of FIG. 1. However, the algorithm 455 may be performed using any other suitable device and in any other suitable system, such as when the algorithm 455 is performed using the server 106. Also, the results shown here are examples only and can vary widely based on the image data being processed.

As shown in FIG. 5A, the kernel estimation algorithm 455 estimates a blur kernel 320 using an extract luma channel algorithm 500, a bilateral filter algorithm 505, a shock filter algorithm 510, and first and second partial derivative algorithms 515 and 520. A kernel is a small matrix used to apply effects, such as blurring and sharpening. Here, one step of the blur kernel estimation is to estimate image gradient maps by restoring strong edges of one or more blurry images 525. Each blurry image 525 includes image data in multiple channels of a color space. One example of a color space and its constituent channels that may be used for the images 525 is the "YCbCr" color space, where each pixel of an image is expressed as a luminance (Y) channel value, a blue-difference chrominance (Cb) channel value, and a red-difference chrominance (Cr) channel value. The extract luma channel algorithm 500 can extract a luminance channel image 530 for processing to determine the blur kernel 320. The luminance channel information is input to the bilateral filter algorithm 505 and the second partial derivative algorithm 520. To restore the strong edges, the bilateral filter algorithm 505 and the shock filter algorithm 510 are applied sequentially to the luminance channel image 530. The bilateral filter algorithm 505 suppresses noise and small details in a bilateral-filtered image 535, and the shock filter algorithm 510 restores strong edges in a shock-filtered image 540.

After the strong edges are restored, the first and second partial derivative algorithms 515 and 520 generate gradients and thresholds that are applied to the gradients in order to generate a gradient map. The partial derivative is respectively taken along horizontal and vertical directions by the algorithms 515 and 520 using a threshold magnitude. The first partial derivative algorithm 515 produces a first sharp gradient map $P_1$ 545 and a second sharp gradient map $P_2$ 550. The second partial derivative algorithm 520 produces a first blur gradient map 555 and a second blur gradient map 560. The colors of the gradient maps 545-560 may be inverted to better show the details of the gradient maps generated.

Using an estimated gradient map, the blur kernel 320 can be estimated as follows:

$$h^* = \arg\min_h \sum_j w_j \|h * P_j - Q_j\|_2^2 + \beta \|h\|_2^2 \tag{5}$$

where $P_j$ represents an estimated gradient map ($g_x$, $g_y$) and its derivatives, and $Q_j$ represents gradient maps and derivatives of the input blurry image. This can be represented as:

$$\{g^{(j)}, I^{(j)}\} \in \left\{(g_x, \partial_x I), (g_y, \partial_y I), (\partial_x g_x, \partial_{xx} I), (\partial_y g_y, \partial_{yy} I),\right. \tag{6}$$
$$\left.\left(\frac{(\partial_x g_y + \partial_y g_x)}{2}, \partial_{xy} I\right)\right\}$$

where j represents different partial derivatives, $w_j$ represents their corresponding weights, and $\beta$ represents the $I_2$ regularization parameter for the kernel estimation. The kernel estimation procedure can be iterated with multiple scales, such as following a coarse-to-fine order, to increase an accuracy of an estimation and repeated multiple times for each scale. Blur kernels have been observed to have similar shapes. Because many kernels are computed, an average can be taken according to:

$$h_f^* = \frac{1}{N} \sum_{i=1}^{N} h_i^* \tag{7}$$

The averaged kernel can be approximated using a parameterized anisotropic Gaussian function, which stabilizes kernel randomness and facilitates additional parameter tuning. The Gaussian function can be represented as follows:

$$G_f = \frac{1}{2\pi\sigma_x\sigma_y} \exp\left(-\frac{x^2}{2\sigma_x^2} - \frac{y^2}{2\sigma_y^2}\right) \tag{8}$$

$$\sigma_x^*, \sigma_x^* = \arg\min_{\sigma_x,\sigma_y} \|h_f^* - G_f\|_{l^2} \tag{9}$$

where h* represents an estimated blur kernel for each image, $h_f^*$ represents a kernel after averaging all estimated blur kernels, and $G_f(x, y)$ represents a two-dimensional Gaussian function of x and y. Also, $\sigma_x$ and $\sigma_y$ represent standard deviations along x and y directions, respectively. For example, assuming a kernel size is smaller than 50 pixels, x=−25 . . . 25, y=−25 . . . 25. The function $G_f(x, y)$ can be represented as follows:

$$G_f(x, y) = \frac{1}{2\pi\sigma_x\sigma_y} \exp\left(-\frac{x^2}{2\sigma_x^2} - \frac{y^2}{2\sigma_y^2}\right) \tag{10}$$

The average blur kernels estimated from MISR images tend to have similar shapes as anisotropic Gaussian kernels and can be modeled using them if necessary. An anisotropic Gaussian kernel can be represented as follows:

$$[x, y] = \frac{1}{2\pi\sigma_x^*\sigma_x^*} \exp\left\{-\frac{x^2}{2\sigma_x^{*2}} - \frac{y^2}{2\sigma_y^{*2}}\right\} \tag{11}$$

Following the degradation model of Equation (11), image deblurring can be formulated into an optimization problem, which can be represented as follows:

$$I_{deblur} = \arg\min \|I_{LR} - I*k\|_2^2 + \rho\|I - I_{LR}\|_2^2 \tag{12}$$

where $\rho > 0$ regulates the deblurred image $I_{deblur}$ to be close to $I_{LR}$ when $\rho$ is large. Assuming that the convolution is carried out as a circular convolution, Equation (12) has a closed-form solution, which can be expressed as follows:

$$I_{deblur} = \mathcal{F}^{-1}\left(\frac{\overline{\mathcal{F}(k)}\mathcal{F}(I_{LR}) + \rho\mathcal{F}(I_{LR})}{\overline{\mathcal{F}(k)}\mathcal{F}(k) + \rho}\right) \quad (13)$$

where F represents a fast Fourier transform (FFT), $F^{-1}$ represents an inverse FFT, and $\overline{F}$ refers to a complex conjugate of the FFT.

Figure 6:
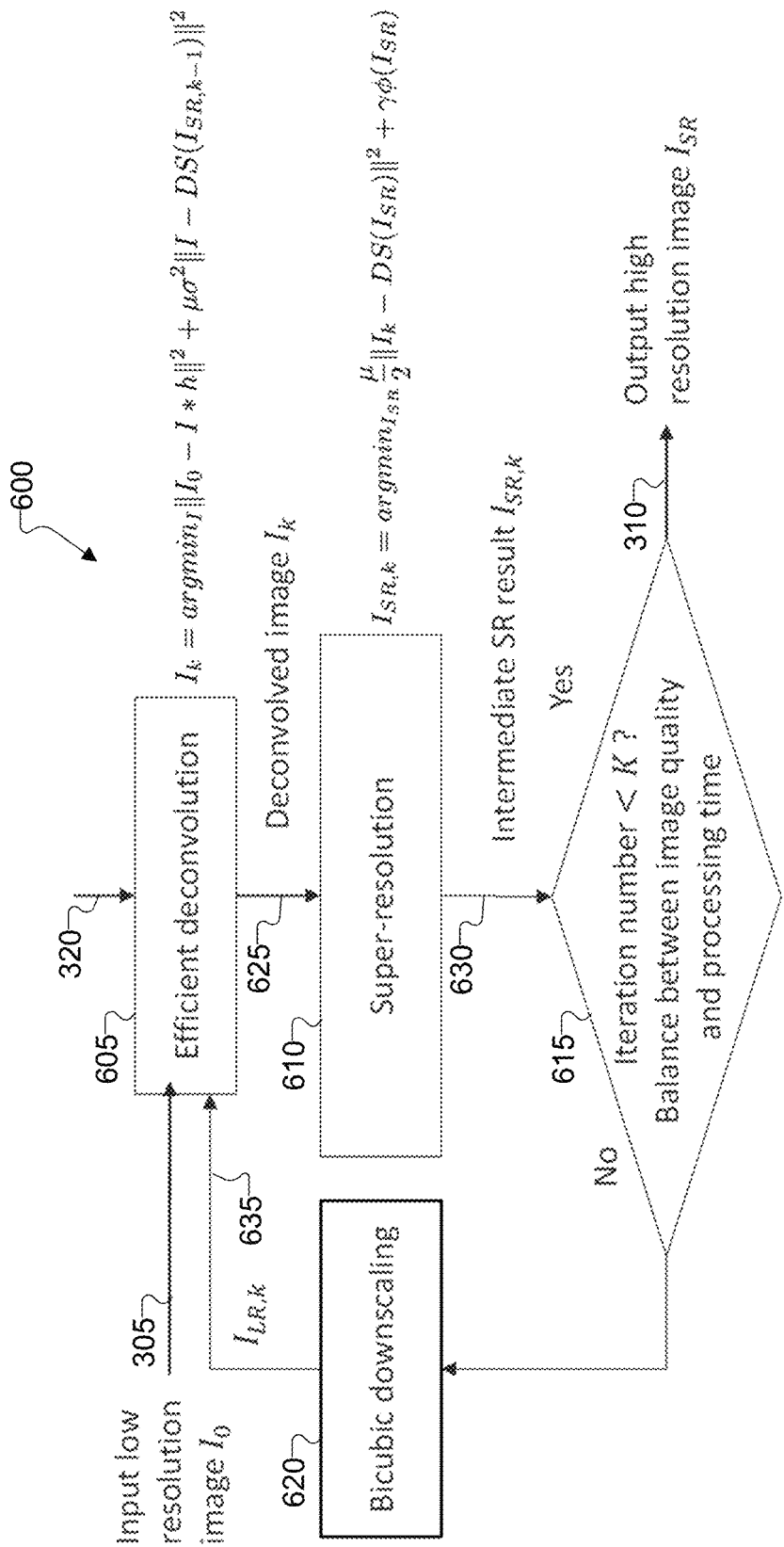
FIG. 6 illustrates an example kernel-aware single-image super resolution method according to embodiments of this disclosure.

FIG. 6 illustrates an example kernel-aware single-image super resolution method 600 according to embodiments of this disclosure. For ease of explanation, the method 600 of FIG. 6 may be described as being performed using the electronic device 101 of FIG. 1. However, the method 600 may be performed using any other suitable device and in any other suitable system, such as when the method 600 is performed using the server 106.

Many SISR algorithms suffer from amplification of noise artifacts and do not outperform bicubic interpolation when applied to multi-frame blended super resolution images. These flaws are due to images not having the same quality as simple bicubic downscaled images commonly used for SISR algorithms.

As shown in FIG. 6, the method 600 includes a deconvolution algorithm 605, a super resolution algorithm 610, an iteration algorithm 615, and a bicubic downscaling algorithm 620. Based on needing a different modeling for SISR that could address blurriness of multi-frame blended super resolution images, deconvolution is applied to an image prior to super resolution, and simultaneous denoising and super resolution are used to suppress sharpening and noise artifacts. To prevent losing image details from denoising, two intermediate super resolution images are generated with different denoising levels and combined to get a final output super resolution image. In the model, the high-resolution image $I_{SR}$ is estimated from the low-resolution image $I_0$. An optimization cost function may be used to solve this inverse problem, which can be expressed as follows:

$$L(I, I_{SR}) = \frac{1}{2\sigma^2}\|I_0 - I*h\|^2 + \gamma\phi(I_{SR}) + \frac{\mu}{2}\|I - DS(I_{SR})\|^2 \quad (14)$$

where σ, λ, and μ represent regularization parameters. An iterative solution to minimize the cost function may occur as follows.

The deconvolution algorithm 605 produces a deconvolved image 625 using inputs including a low-resolution image 305 and a blur kernel 320 in a cost function. An estimation of the blur kernel 320 is described above with respect to FIGS. 5A and 5B. In some cases, the cost function can be expressed as follows:

$$I_k = \operatorname{argmin}_I \|I_0 - I*h\|^2 + \mu\sigma_2\|I - DS(I_{SR,k-1})\|^2 \quad (15)$$

$$\alpha = \mu\sigma^2 \quad (16)$$

where $I_0$ represents an input low-resolution image 305, and h represents an estimated blur kernel 320. The expression $\|I - DS(I_{SR,k-1})\|_2^2$ is a regularization term that causes an estimated image to be consistent with a downscaled version of a previous iteration's super resolution result $DS(I_{SR,k})$ 635. The parameter a regularizes an amount of blur removal, and results gets closer to $DS(I_{SR,k})$ as a increases, thereby generating less amount of blur removal in a result image. As iteration continues, a gradually increases. Thus, $\alpha_k$ is used to denote a in each iteration. For k=1,$DS(I_{SR,0})=I_0$ is used. In some cases, a least-squares deblurring can be efficiently computed using FFT as below, where $\mathcal{F}(\bullet)$ denotes the FFT and $\mathcal{F}^{-1}(\bullet)$ denotes the inverse FFT. The cost function can be adapted as follows:

$$I_k = \mathcal{F}^{-1}\left(\frac{\overline{\mathcal{F}(h)}\mathcal{F}(I_0) + \alpha_k\mathcal{F}(DS(I_{SR,k-1}))}{\overline{\mathcal{F}(h)}\mathcal{F}(h) + \alpha_k}\right) \quad (17)$$

where $I_k$ represents a $k^{th}$ iteration output. The SR algorithm 610 produces an intermediate super resolution image 630 using the deconvolved image in a loss function. The intermediate super resolution image can be the clean super resolution image 470 and the detail super resolution image 475 shown in FIG. 4. The loss function can be expressed as follows:

$$I_{SR,k} = \operatorname{argmin}_{I_{SR}} \frac{\mu}{2}\|I_k - DS(I_{SR})\|^2 + \gamma\phi(I_{SR}) \quad (18)$$

Image super resolution is performed using a trained conditional generative adversarial network (CGAN). In this stage, the input image is assumed to have an ideal point spread function and is not blurry. The network generator also takes an estimated noise level μ as its input and performs denoising simultaneously as it performs super resolution.

The iteration algorithm 615 can determine whether an iteration number is less than K. The two equations are alternating minimization problems with respect to I and $I_{SR}$. In particular, the first equation is trying to solve the deconvolution problem, and the second equation addresses a traditional or other super resolution problem. The iteration algorithm 615 considers a balance between image quality and processing time. When the iteration count is not greater than K, the bicubic downscaling algorithm 620 is performed on the intermediate super resolution image 630. When the iteration count is greater than K, the high-resolution image 310 is output. The bicubic downscaling algorithm 620 generates a second low-resolution image 635 from the intermediate super resolution image 630. The second low-resolution image 635 is provided as feedback to the deconvolution algorithm 605 for a following iteration.

Figure 7A:
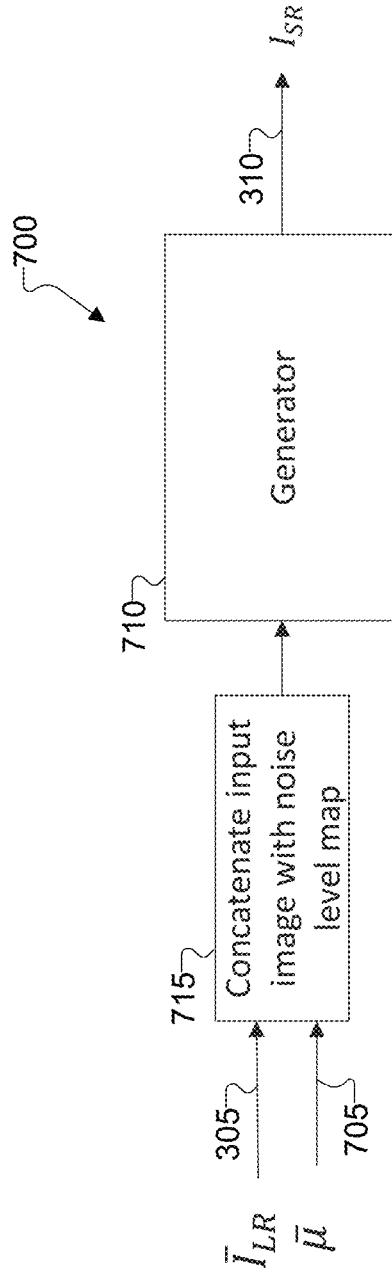
FIGS. 7A and 7B illustrate an example generation process for a conditional generative adversarial network algorithm according to embodiments of this disclosure.
Figure 7B:
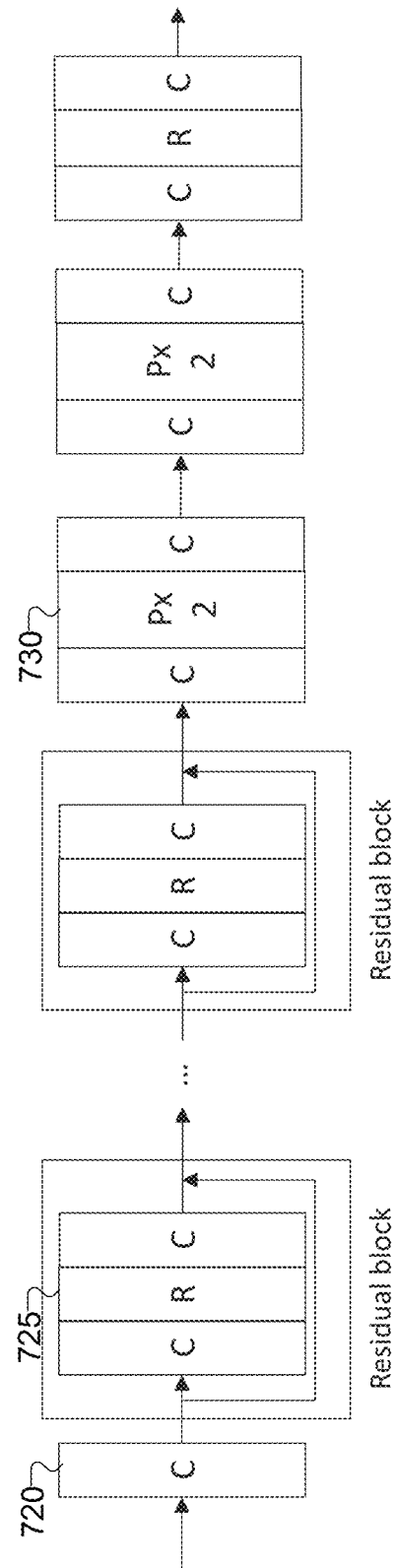
Figure 8A:
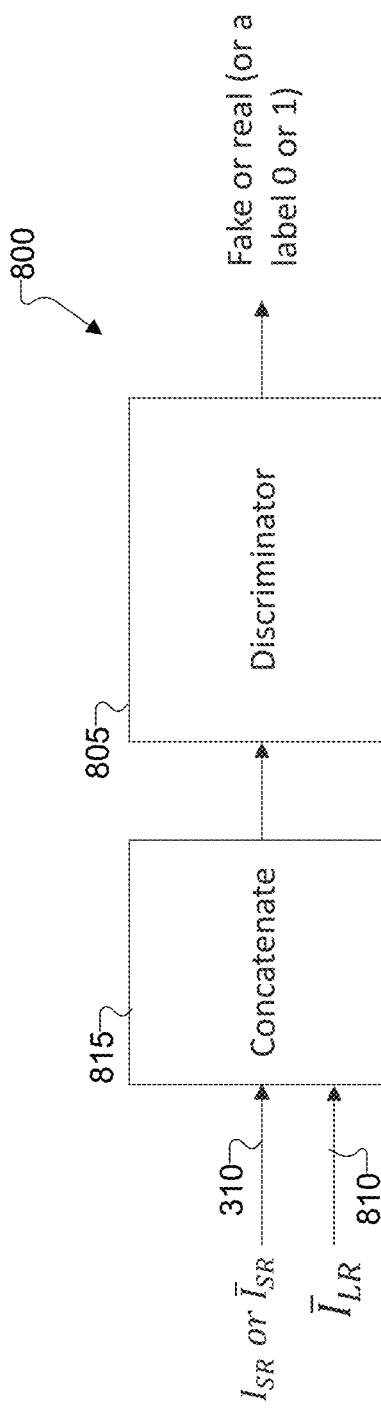
FIGS. 8A and 8B illustrate an example discriminator process for a conditional generative adversarial network algorithm according to embodiments of this disclosure.
Figure 8B:
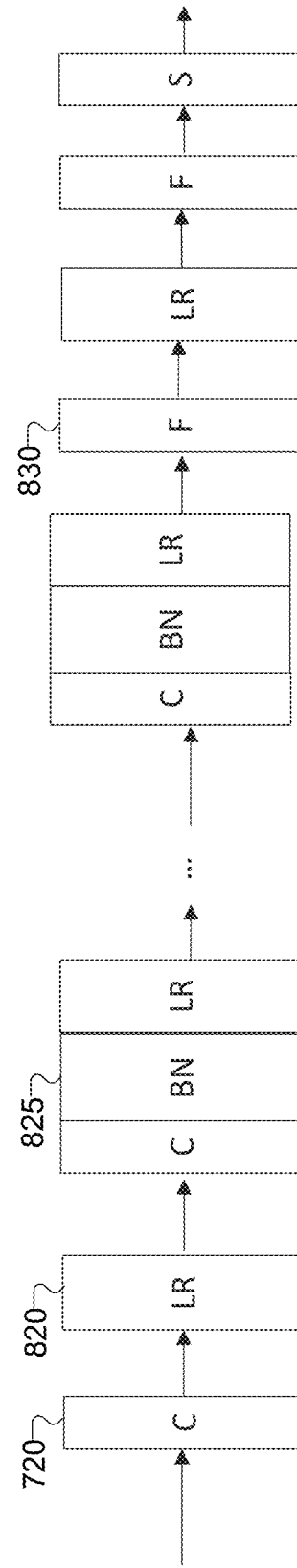

FIGS. 7A and 7B illustrate an example generation process 700 for a conditional generative adversarial network algorithm according to embodiments of this disclosure. FIGS. 8A and 8B illustrate an example discriminator process 800 for a conditional generative adversarial network algorithm according to embodiments of this disclosure. For ease of explanation, the processes 700 and 800 may be described as being performed using the electronic device 101 of FIG. 1. However, the processes 700 and 800 may be performed using any other suitable device and in any other suitable system, such as when the processes 700 and 800 are performed using the server 106.

Image super resolution can be performed using a trained conditional generative adversarial network (CGAN). In this stage, an input image is assumed to have an ideal point spread function and is not blurry. The network generator also takes an estimated noise level μ as its input and performs denoising simultaneously with super resolution. From a mathematical perspective, super resolution attempts to solve the inverse problem from Equation (1), where I represents a low-resolution image 310, $I_{SR}$ represents a high-resolution deconvolved image to be estimated, DSO represents bicubic downsampling, and N represents white Gaussian noise with standard deviation μ 705. In order to estimate $I_{SR}$ 310 from Equation (1), I and μ need to be known. From an application perspective, μ 705 as the input noise level is treated like a tuning knob to control the network output. For example, when a training sample has a high noise level, the network does more denoising work in addition to super resolution. Additional denoising work is also reflected in the inference stage. If a high noise level is fed for a test sample, the network similarly does a lot of denoising work on the image in a manner that the network output is quite smooth. This also corresponds to the artifact suppression algorithm 480 where two different noise level parameters are used and solved for clean and detailed super resolution results.

In a training stage, a CGAN can be used to learn image super resolution subtasks. Here, CGAN includes the generation process 700 and the discriminator process 800. A fake sample G(z) can be generated by the generator algorithm 710 from input noise z, and the discriminator algorithm 805 aims to estimate the probability that the fake sample is from training data rather than generated by the generator algorithm 710. These two networks are iteratively trained until the discriminator cannot tell if the sample is real or fake. This process can be summarized as a two-player min-max game, which can be expressed as follows:

$$\min_G \max_D E_{x \sim p(x)}[\log(D(x))] + E_{z \sim p(z)}[\log(1 - D(G(z)))] \quad (19)$$

where x represents ground-truth data, z represents input noise, D represents the discriminator algorithm 805, and G represents the generator algorithm 710. CGAN feeds auxiliary information to both the generator algorithm 710 and the discriminator algorithm 805 to direct the data generation process, which can be expressed as follows:

$$\min_G \max_D E_{x \sim p(x)}[\log(D(x|y))] + E_{z \sim p(z)}[\log(1 - D(G(z|y)|y))] \quad (20)$$

where y is the observed data.

For super resolution, each dataset in training data includes (1) an original high-resolution image 310 $\overline{I}_{SR}$, (2) a low-resolution image 810 $\overline{I}_{LR} = DS(\overline{I}_{SR})$ N, where N is the additive Gaussian noise with standard deviation $\overline{\mu}$ 705, and (3) a noise standard variance $\overline{\mu}$. Thus, CGAN uses the following definitions, where x represents a ground-truth high-resolution image $\overline{I}_{SR}$, y represents a result of concatenating of an observed low-resolution image $\overline{I}_{LR}$ and a noise level map, and Z represents input noise. The noise level map has the same spatial size of the low-resolution image and all the elements are $\overline{\mu}$. Specifically, if the low-resolution image has a size 540×720×3, y has a size 540×720×4. Using these symbols, the definition of CGAN can be represented as follows:

$$\min_G \max_D E_{x \sim p(x)}[\log(D(\overline{I}_{SR}|\overline{I}_{LR}))] + E_{z \sim p(z)}[\log(1 - D(G(\text{concatenate}(\overline{I}_{LR}, \overline{\mu}))|\overline{I}_{LR}))] \quad (21)$$

As shown in FIGS. 7A and 7B, a concatenate algorithm 715 links the low-resolution image 305 and a standard deviation 705. The generator algorithm 710 can be represented as follows:

$$I_{SR} = G(\text{concatenate}(\overline{I}_{LR}, \overline{\mu})) \quad (22)$$

Based on this expression of the generator algorithm 710, a loss function can be represented as follows:

$$l_G = \frac{\overline{\mu}}{2}\|\overline{I}_{LR} - DS(I_{SR})\|_2^2 + \gamma\|\overline{I}_{SR} - I_{SR}\|_2^2 - \log D(I_{SR}|\overline{I}_{LR}) \quad (23)$$

Here, $-\log D(I_{SR}|\overline{I}_{LR})$ is the simplified version of the second term, which can be represented as follows:

$$E_{z \sim p(z)}[\log(1 - D(G(\text{concatenate}(\overline{I}_{LR}, \overline{\mu}))|\overline{I}_{LR}))] \quad (24)$$

where DS( ) represents a bicubic downsampling function, and D( ) represents a discriminator function. The third term represents adversarial loss. The training process is focused on minimizing this loss function. The specific network layers of one example of the generator algorithm 710 are illustrated in FIG. 7B, where C represents a convolution layer 720, R represents a rectified linear activation function (Relu) layer 725, and P×2 represents a pixel shuffler layer 730 with an upscale by two. The pixel shuffler layer 730 is an operation used in the super resolution model to implement efficient sub-pixel convolutions with a stride of 1/s.

As shown in FIGS. 8A and 8B, a concatenate algorithm 815 links the $I_{SR}$ image 310 and the $\overline{I}_{LR}$ image 810. The discriminator algorithm 805 determines whether the $I_{SR}$ image is real or fake. A loss function of the discriminator algorithm 805 can be represented as follows:

$$l_D = \log D(\overline{I}_{SR}|\overline{I}_{LR}) + \log(1 - D(I_{SR}|\overline{I}_{LR})) \quad (25)$$

where the first part of Equation (25) is a simplified version of:

$$E_{x \sim p(x)}[\log(D(\overline{I}_{SR}|\overline{I}_{LR}))] \quad (26)$$

and the second part of Equation (25) is a simplified version of:

$$E_{z \sim p(z)}[\log(1 - D(G(\text{concatenate}(\overline{I}_{LR}, \overline{\mu}))|\overline{I}_{LR}))] \quad (27)$$

One example of the network layers of the discriminator algorithm 805 are illustrated in FIG. 8B, where C represents a convolution layer 720, LR represents a leaky Relu layer 820, BN represents a batch normalization layer 825, and F represents a fully-connected layer 830.

Once the system is actually trained, only the generator algorithm 710 is used to generate a high-resolution image $I_{SR,k}$ 310 given a low-resolution image $I_k$ 305. In an inference stage, the generator algorithm 710 can be represented as follows:

$$I_{SR,k} = G(I_k; \mu_{k+1}), k = 1, \ldots, K \quad (28)$$

where $\mu_k$ is the estimated noise level in each iteration. In the generator algorithm 710, different sets of $\mu_k$ can be given to generate over-smooth and detail-preserving high-resolution images.

Figure 9:
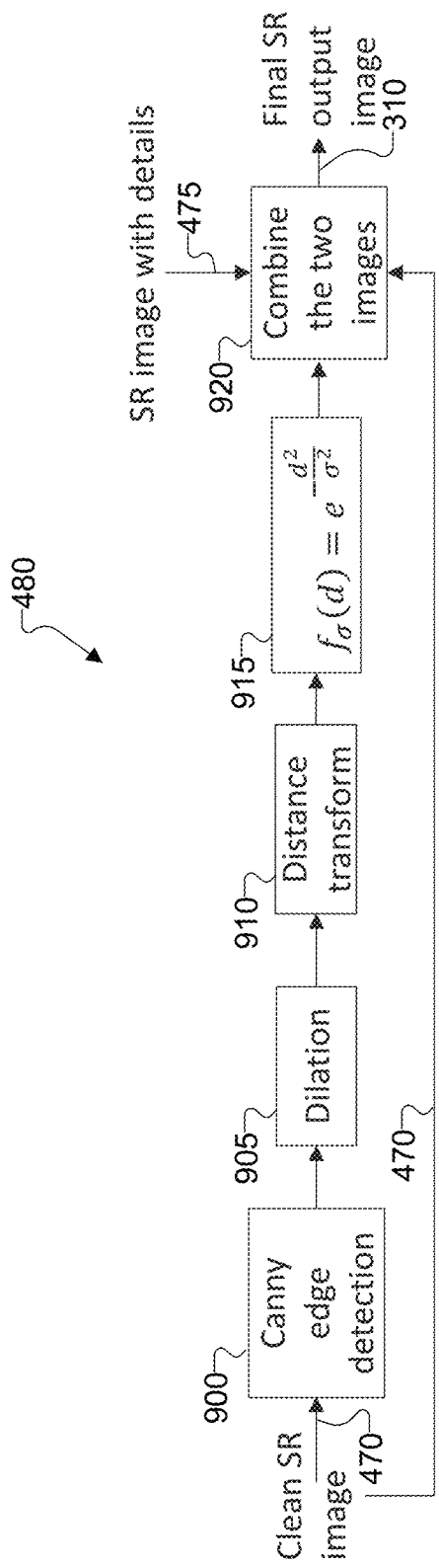
FIG. 9 illustrates an example artifact suppression algorithm according to embodiments of this disclosure.

FIG. 9 illustrates an example artifact suppression algorithm 480 according to embodiments of this disclosure. For ease of explanation, the algorithm 480 of FIG. 9 may be described as being performed using the electronic device 101 of FIG. 1. However, the algorithm 480 may be performed using any other suitable device and in any other suitable system, such as when the algorithm 480 is performed using the server 106.

As shown in FIG. 9, input multi-frame blended super resolution images for SISR tend to contain noise, which often gets amplified in output super resolution images generated by modern SISR algorithms. Therefore, the artifact suppression algorithm 480 can perform denoising simultaneously with super resolution to suppress noise artifacts. The artifact suppression algorithm 480 here includes a canny edge algorithm 900, a dilation algorithm 905, a distance transform algorithm 910, an exponential function algorithm 915, and image combine algorithm 920. Additionally, denoising also removes sharpening artifacts generated from the deblurring step. For simultaneous super resolution and denoising, a pretrained super resolution network can be used in SRResNet+, which is a version of SRResNet that is modified to take noise level as an additional input by adding a fourth channel to an input image with a constant value over an entire channel that corresponds to an input noise level.

While denoising is needed to suppress sharpening artifacts and noise, it also tends to remove image details in an output super resolution image. Furthermore, SRResNet+ tends to generate clean edges when applied with a large noise level input. To get output super resolution images with clean edges while keeping image details, two intermediate super resolution images are generated by using two different noise level inputs and then blending the two intermediate super resolution images together to generate the final output super resolution image. For simplicity, the intermediate super resolution image generated with a large input noise level can be referred to as a "clean super resolution image" and the inter-mediate super resolution image generated with a small input noise level can be referred to as a "detail super resolution image".

To generate a blending map for blending the two intermediate images, the strong edges in the clean super resolution image 470 are identified using the canny edge detection algorithm 900. The canny edge detection algorithm 900 may represent a multi-stage process that detects a wide range of edges in images. The dilation algorithm 905 is applied to the edge detection results to find the regions near the strong edges in the clean super resolution image 470. The distance transform algorithm 910 is used to adjust distance between objects or pixels. After that, the exponential algorithm 915, such as a box blur, is applied to generate the final blending map. The image combine algorithm 920 uses the blending map to take the clean super resolution image 470 where it contains strong edges while keeping the detail super resolution image 475 where strong edges are not present in the clean super resolution image 470.

Figure 10:
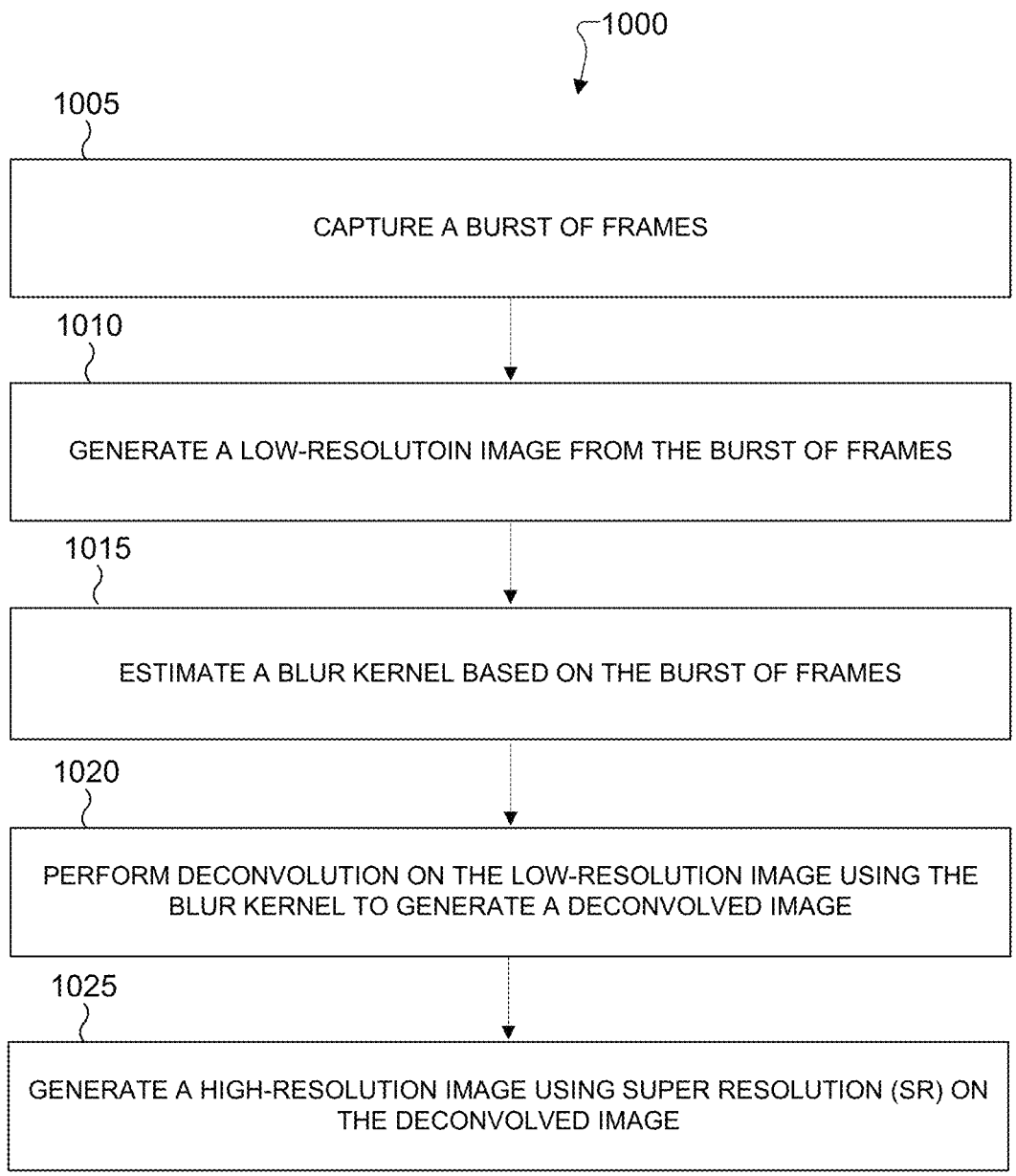
FIG. 10 illustrates an example process for kernel-aware single-image super resolution according to embodiments of this disclosure.

FIG. 10 illustrates an example process 1000 for kernel-aware single-image super resolution according to embodiments of this disclosure. For ease of explanation, the process 1000 of FIG. 10 may be described as being performed using the electronic device 101 of FIG. 1. However, the process 1000 may be performed using any other suitable device and in any other suitable system, such as when the process 1000 is performed using the server 106.

In operation 1005, the electronic device 101 captures a burst of image frames using at least one camera or other imaging sensor. The burst of image frames can be a Bayer input set. The burst of image frames can be taken at a single resolution or different resolutions. Note, however, that the burst of image frames may be obtained from any other suitable source, such as when retrieved from a storage or received from an external device. In operation 1010, the electronic device 101 generates a low-resolution image from the burst of image frames. For example, the Bayer input set may be Bayer processed into a single image. A low-resolution or blurry image can be generated by zooming in on a patch in a single image, with any remaining portion(s) of the single image cropped out.

In operation 1015, the electronic device 101 estimates a blur kernel based on the burst of image frames. For example, a kernel modeling approach can involve a blur kernel approximated by a parameterized anisotropic Gaussian function, which is consistent with an average blur kernel estimated from an input image dataset. The average blur kernel and blur kernel approximated by the Gaussian function modeling make the kernel estimation stable. An initial blur kernel estimation may be formulated as an optimization of a cost function that requires fidelity between gradient maps of the blurry image and the convolution of predicted gradient maps and the blur kernel to be estimated. The predicted gradient maps can be generated by applying a bilateral filter, a shock filter, and magnitude thresholding on the blurry or low-resolution image. Another kernel can be generated by averaging the blur kernels estimated from a large amount of image patches and approximated by a parameterized anisotropic Gaussian function. This approximation stabilizes kernel randomness and facilitates additional parameter tuning.

In operation 1020, the electronic device 101 performs deconvolution on the low-resolution image using the blur kernel to generate a deconvolved image. The deconvolution operation involves using the blur kernel to remove blurry areas from the low-resolution image. The deconvolution can be a least-squares deconvolution. The electronic device 101 can set a noise level to suppress artifacts of the deconvolution. The noise level is used as extra input in the processing of the low-resolution image. The artifacts of deconvolution can be suppressed by setting the noise level.

In operation 1025, the electronic device 101 generates a high-resolution image 310 using super resolution (SR) on the deconvolved image. The electronic device 101 can alternate between deblurring and super-resolution to gradually improve the quality of the output upscaled image. The electronic device 101 can blend multiple high-resolution images generated using different prior regularization parameters suppressing halo artifacts and detail loss. Once generated, the final high-resolution image 310 of a scene can be stored, output, or used in any suitable manner.

Although FIG. 10 illustrates one example of a process 1000 for kernel-aware single-image super resolution, various changes could be made to FIG. 10. For example, while shown as a series of steps, various steps in FIG. 10 could overlap, occur in parallel, occur in a different order, or occur multiple times.

Note that the functions and other operations described above can be implemented in an electronic device 101, 102, 104, server 106, or other device in any suitable manner. For example, in some embodiments, the operations described above can be implemented or supported using one or more software applications or other software instructions that are executed by at least one processor 120 of a device. In other embodiments, at least some of the operations described above can be implemented or supported using dedicated hardware components. In general, the operations described above can be performed using any suitable hardware or any suitable combination of hardware and software/firmware instructions.

Although this disclosure has been described with example embodiments, various changes and modifications may be suggested to one skilled in the art. It is intended that this disclosure encompass such changes and modifications as fall within the scope of the appended claims.

What is claimed is:

1. An electronic device configured to provide for kernel-aware super resolution, the electronic device comprising:
   at least one imaging sensor configured to capture a burst of image frames; and at least one processor coupled to the at least one imaging sensor, the at least one processor configured to:
generate a low-resolution image from the burst of image frames;
estimate a blur kernel based on the burst of image frames;
perform deconvolution on the low-resolution image using the blur kernel to generate a deconvolved image;
generate multiple high-resolution images using different prior regularization parameters for super resolution on the deconvolved image; and
blend the high-resolution images to generate a final image of a scene.

2. The electronic device of claim 1, wherein the at least one processor is further configured to iteratively perform deconvolution and super resolution on the low-resolution image in order to generate the high-resolution images.

3. The electronic device of claim 1, wherein the at least one processor is further configured to set a noise level to suppress artifacts of the deconvolution.

4. The electronic device of claim 1, wherein the multiple high-resolution images include a clean super resolution image and a detailed super resolution image.

5. The electronic device of claim 1, wherein the at least one processor is configured to approximate the blur kernel using a parameterized anisotropic Gaussian function that is consistent with an average blur kernel estimated from the burst of image frames.

6. The electronic device of claim 1, wherein the at least one processor is further configured to:
generate gradient maps using a bilateral filter, a shock filter, and magnitude thresholding on the low-resolution image; and
estimate an initial blur kernel using an optimization of a cost function that requires fidelity between the gradient maps of the low-resolution image.

7. The electronic device of claim 1, wherein the at least one processor is further configured to generate an average blur kernel from a plurality of blur kernels estimated from a plurality of patches and approximated by a parameterized anisotropic Gaussian function.

8. A method for kernel-aware super resolution, the method comprising:
capturing, using at least one imaging sensor of an electronic device, a burst of image frames;
generating, using at least one processor of the electronic device, a low-resolution image from the burst of image frames;
estimating, using the at least one processor, a blur kernel based on the burst of image frames;
performing, using the at least one processor, deconvolution on the low-resolution image using the blur kernel to generate a deconvolved image;
generating, using the at least one processor, multiple high-resolution images using different prior regularization parameters for super resolution on the deconvolved image; and
blending the high-resolution images to generate a final image of a scene.

9. The method of claim 8, further comprising:
iteratively performing deconvolution and super resolution on the low-resolution image in order to generate the high-resolution images.

10. The method of claim 8, further comprising:
setting a noise level to suppress artifacts of the deconvolution.

11. The method of claim 8, wherein the multiple high-resolution images include a clean super resolution image and a detailed super resolution image.

12. The method of claim 8, further comprising:
approximating the blur kernel using a parameterized anisotropic Gaussian function that is consistent with an average blur kernel estimated from the burst of image frames.

13. The method of claim 8, further comprising:
generating gradient maps using a bilateral filter, a shock filter, and magnitude thresholding on the low-resolution image; and
estimating an initial blur kernel using an optimization of a cost function that requires fidelity between the gradient maps of the low-resolution image.

14. The method of claim 8, further comprising:
generating an average blur kernel from a plurality of blur kernels estimated from a plurality of patches and approximated by a parameterized anisotropic Gaussian function.

15. A non-transitory machine readable medium storing instructions that are configured to provide for kernel-aware super resolution, wherein the instructions, when executed by at least one processor of an electronic device, cause the at least one processor to:
obtain a burst of image frames;
generate a low-resolution image from the burst of image frames;
estimate a blur kernel based on the burst of image frames;
perform deconvolution on the low-resolution image using the blur kernel to generate a deconvolved image;
generate multiple high-resolution images using different prior regularization parameters for super resolution on the deconvolved image; and
blend the high-resolution images to generate a final image of a scene.

16. The non-transitory machine readable medium of claim 15, further containing instructions that when executed cause the at least one processor to:
iteratively perform deconvolution and super resolution on the low-resolution image in order to generate the high-resolution images.

17. The non-transitory machine readable medium of claim 15, further containing instructions that when executed cause the at least one processor to:
set a noise level to suppress artifacts of the deconvolution.

18. The non-transitory machine readable medium of claim 15, wherein the multiple high-resolution images include a clean super resolution image and a detailed super resolution image.

19. The non-transitory machine readable medium of claim 15, further containing instructions that when executed cause the at least one processor to:
approximate the blur kernel using a parameterized anisotropic Gaussian function that is consistent with an average blur kernel estimated from the burst of image frames.

20. The non-transitory machine readable medium of claim 15, further containing instructions that when executed cause the at least one processor to:
generate gradient maps using a bilateral filter, a shock filter, and magnitude thresholding on the low-resolution image; and
estimate an initial blur kernel using an optimization of a cost function that requires fidelity between the gradient maps of the low-resolution image.

* * * * *